United States Patent
Cox et al.

(10) Patent No.: US 11,082,731 B1
(45) Date of Patent: Aug. 3, 2021

(54) PRIVACY-PRESERVING VIDEO ANALYTICS

(71) Applicant: Microsoft Technology Licensing, LLC, Redmond, WA (US)

(72) Inventors: Landon Prentice Cox, Seattle, WA (US); Paramvir Bahl, Bellevue, WA (US); Sandeep Maurice Dsouza, Pittsburgh, PA (US); Lixiang Ao, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/749,457

(22) Filed: Jan. 22, 2020

(51) Int. Cl.
| | |
|---|---|
| *H04N 21/2389* | (2011.01) |
| *G06K 9/00* | (2006.01) |
| *G06K 9/62* | (2006.01) |
| *H04N 21/4408* | (2011.01) |
| *H04N 21/44* | (2011.01) |
| *H04N 21/239* | (2011.01) |
| *H04N 21/84* | (2011.01) |
| *H04N 21/234* | (2011.01) |

(52) U.S. Cl.
CPC ... *H04N 21/23895* (2013.01); *G06K 9/00771* (2013.01); *G06K 9/628* (2013.01); *H04N 21/2393* (2013.01); *H04N 21/23418* (2013.01); *H04N 21/4408* (2013.01); *H04N 21/44008* (2013.01); *H04N 21/84* (2013.01); *G06K 2209/27* (2013.01)

(58) Field of Classification Search
CPC ................................................ H04N 21/23895
See application file for complete search history.

(56) References Cited

U.S. PATENT DOCUMENTS

| | | | |
|---|---|---|---|
| 2015/0254513 A1* | 9/2015 | Mansour | G06K 9/00751 382/190 |
| 2017/0300757 A1 | 10/2017 | Wolf | |
| 2018/0268240 A1* | 9/2018 | Loce | G11B 27/105 |
| 2019/0044703 A1 | 2/2019 | Smith | |
| 2019/0218407 A1 | 7/2019 | Borras et al. | |

OTHER PUBLICATIONS

"A Smart Camera for the Intelligent Edge", Retrieved From: https://azure.github.io/Vision-AI-DevKit-Pages/, Retrieved on: Jan. 2020, 4 Pages.
"Blur Moving Objects in Your Video with the New Custom Blurring Tool on Youtube", Retrieved From: https://youtube-creators.googleblog.com/2016/02/blur-moving-objects-in-your-video-with.html, Feb. 25, 2016, 3 Pages.
"Ffmpeg Project", Retrieved From: https://ffmpeg.org/about.html, Retrieved on: Jan. 8, 2020, 3 Pages.

(Continued)

*Primary Examiner* — Michael H Hong
(74) *Attorney, Agent, or Firm* — Schwegman Lundberg & Woessner, P.A.

(57) ABSTRACT

Generally discussed herein are devices, systems, and methods for privacy-preserving video. A method can include identifying which classes of objects are present in video data, for each class of the classes identified in the video data, generating respective video streams that include objects of the class and exclude objects not of the class, and providing each of the respective video streams to a content distribution network.

20 Claims, 12 Drawing Sheets

(56) References Cited

OTHER PUBLICATIONS

"Geforce GTX 1070", Retrieved From: https://www.geforce.com/hardware/desktop-gpus/geforce-gtx-1070/specifications, Retrieved on: Jan. 9, 2020, 2 Pages.
"HTTP Live Streaming", Retrieved From: https://developer.apple.com/documentation/http_live_streaming, Retrieved on: Jan. 9, 2020, 2 Pages.
"Intel R CoreTM i7-7700 Processor", Retrieved From: https://www.intel.com/content/www/us/en/products/processors/core/i7-processors/i7-7700.html, Retrieved on: Jan. 8, 2020, 10 Pages.
"Introducing Background Blur in Skype", Retrieved From: https://blogs.skype.com/news/2019/02/06/introducing-background-blur-in-skype/, Feb. 6, 2019, 5 Pages.
"NATS Streaming Server", Retrieved From: https://github.com/nats-io/nats-streaming-server, Retrieved on: Jan. 8, 2020, 2 Pages.
"NGINX HTTP Server", Retrieved From: https://www.nginx.com/resources/wiki/, Retrieved on: Jan. 8, 2020, 4 Pages.
"NVIDIA Jetson AGX Xavier Developer Kit", Retrieved From: https://developer.nvidia.com/embedded/jetson-agx-xavier-developer-kit, Retrieved on: Jan. 8, 2020, 4 Pages.
"OpenCV Tracking API", Retrieved From: https://docs.opencv.org/master/d9/df8/group_tracking.html, Retrieved on: Jan. 8, 2020, 9 Pages.
Aditya, et al., "I-Pic: A Platform for Privacy-Compliant Image Capture", In Proceedings of the 14th Annual International Conference on Mobile Systems, Applications, and Services, Jun. 25, 2016, pp. 235-248.
Ananthanarayanan, et al., "Realtime Video Analytics: The Killer App for Edge Computing", In Journal of the Computer, vol. 50, Issue 10, Oct. 3, 2017, pp. 58-67.
Arutyunyan, Roman, "Streaming with nginx-rtmp-module", Retrieved From: http://nginx-rtmp.blogspot.com/, Jul. 11, 2017, 6 Pages.
Bewley, et al., "Simple Online and Realtime Tracking", In Journal of the Computing Research Repository, Feb. 2, 2016, 5 Pages.
Cai, et al., "Learning Complexity-Aware Cascades for Deep Pedestrian Detection", In Journal of the Computing Research Repository, Jul. 19, 2015, 9 Pages.
Chaudhari, et al., "Privacy Protection for Life-Log Video", In Proceedings of the IEEE Workshop on Signal Processing Applications for Public Security and Forensics, Apr. 1, 2007, 5 Pages.
Chen, et al., "Compressing Neural Networks with the Hashing Trick", In Journal of the Computing Research Repository, Apr. 19, 2015, 10 Pages.
Chen, et al., "VGAN-Based Image Representation Learning for Privacy Preserving Facial Expression Recognition", In Journal of the Computing Research Repository, Mar. 19, 2018, 10 Pages.
Chollet, et al., "Keras: Deep Learning for Humans", Retrieved From: https://github.com/keras-team/keras, Mar. 22, 2015, 5 Pages.
Conger, et al., "San Francisco Bans Facial Recognition Technology", Retrieved From: https://www.nytimes.com/2019/05/14/us/facial-recognition-ban-san-francisco.html, May 14, 2019, 3 Pages.
Culjak, et al., "A Brief Introduction to OpenCV", In Proceedings of the 35th International Convention MIPRO, May 21, 2012, pp. 1725-1730.
Dsouza, et al., "Quartz:Time-as-a-Service for Coordination in Geo-Distributed Systems", In Proceedings of the 4th ACM/IEEE Symposium on Edge Computing, Nov. 7, 2019, pp. 264-279.
Dwork, Cynthia, "Differential privacy", In the Encyclopedia of Cryptography and Security, 2011, pp. 338-340.
Dworkin, et al., "Advanced Encryption Standard", In Proceedings of the Federal Information Processing Standards, 197, Nov. 26, 2001, 51 Pages.
Enev, et al., "Sensorsift: Balancing Sensor Data Privacy and Utility in Automated Face Understanding", In Proceedings of the 28th Annual Computer Security Applications Conference, Dec. 3, 2012, pp. 149-158.
Fielding, et al., "Architectural Styles and the Design of Network-based Software Architectures", In Doctoral Dissertation submitted in partial satisfaction of the requirements for the degree of Doctor of Philosophy in Information and Computer Science, University of California, Jun. 2000, 180 Pages.
Girshick, Ross B.., "Fast R-CNN", In Journal of the Computing Research Repository, Apr. 30, 2015, 9 Pages.
Girshick, et al., "Rich Feature Hierarchies for Accurate Object Detection and Semantic Segmentation", In Journal of the Computing Research Repository, Nov. 11, 2013, 10 Pages.
Han, et al., "Learning Both Weights and Connections for Efficient Neural Networks", In Journal of the Computing Research Repository, Jun. 8, 2015, 9 Pages.
Haskins, Caroline, "A Second U.S. City has Banned Facial Recognition", Retrieved From: https://www.vice.com/en_us/article/paj4ek/somerville-becomes-the-second-us-city-to-ban-facial-recognition, Jun. 28, 2019, 7 Pages.
He, et al., "Deep Residual Learning for Image Recognition", In Journal of Computing Research Repository, Dec. 10, 2015, 12 Pages.
He, et al., "Mask R-CNN", In Journal of the Computing Research Repository, Mar. 20, 2017, 9 Pages.
Henriques, et al., "High-Speed Tracking with Kernelized Correlation Filters", The Journal of the Computing Research Repository, Apr. 30, 2014, 14 Pages.
Hoddie, et al., "Motion JPEG Format", Retrieved From: https://staticky.com/mirrors/ftp.apple.com/developer/Development_Kits/QuickTime/Programming_Stuff/Documentation/QuickTime-JPEGSpec.pdf, Apr. 15, 1996, 6 Pages.
Hsieh, et al., "Focus: Querying Large Video Datasets with Low Latency and Low Cost", In Proceedings of 13th Symposium on Operating Systems Design and Implementation, Oct. 8, 2018, pp. 269-286.
Hung, et al., "VideoEdge: Processing Camera Streams using Hierarchical Clusters", In Proceedings of Third IEEE/ACM Symposium on Edge Computing, Oct. 25, 2018, pp. 115-131.
Hung, et al., "Wide-area Analytics with Multiple Resources", In Proceedings of the Thirteenth EuroSys Conference, Apr. 23, 2018, 16 Pages.
Jana, et al., "A Scanner Darkly: Protecting User Privacy from Perceptual Applications", In Proceedings of the IEEE Symposium on Security and Privacy, May 19, 2013, pp. 349-363.
Jana, et al., "Enabling Fine-Grained Permissions for Augmented Reality Applications with Recognizers", In Proceedings of the 22nd USENIX Security Symposium, Aug. 14, 2013, pp. 415-430.
Jiang, et al., "Chameleon: Scalable Adaptation of Video Analytics", In Proceedings of the Conference of the ACM Special Interest Group on Data Communication, Aug. 20, 2018, pp. 253-266.
Kang, et al., "Optimizing Deep CNN-based Queries Over Video Streams at Scale", In Journal of the Computing Research Repository, Mar. 7, 2017, 13 Pages.
Kelley, et al., "A Conundrum of Permissions: Installing Applications on an Android Smartphone", In Proceedings of the International Conference on Financial Cryptography and Data Security, Feb. 27, 2012, 12 Pages.
Kenthapadi, et al., "PriPeARL: A Framework for Privacy-Preserving Analytics and Reporting at Linkedin", In Proceedings of the 27th ACM International Conference on Information and Knowledge Management, Oct. 22, 2018, pp. 2183-2191.
Kohli, et al., "What is Azure Data Box Edge?", Retrieved From: https://docs.microsoft.com/en-us/azure/databox-online/data-box-edge-overview, Nov. 4, 2019, 4 Pages.
Krizhevsky, A., et al., "ImageNet Classification with Deep Convolutional Neural Networks", In Proceedings of the Advances in Neural Information Processing Systems, vol. 25, Dec. 3, 2012, 9 Pages.
Lienhart, et al., "An Extended Set of Haar-like Features for Rapid Object Detection", In Proceedings of the International Conference on Image Processing, Sep. 22, 2002, pp. 900-903.
Lin, et al., "Microsoft COCO: Common Objects in Context", In Journal of the Computing Research Repository, May 1, 2014, 14 Pages.
Liu, et al., "SSD: Single Shot Multibox Detector", In Journal of the Computing Research Repository, Dec. 8, 2015, 9 Pages.

(56) References Cited

OTHER PUBLICATIONS

Lukezic, et al., "Discriminative Correlation Filter with Channel and Spatial Reliability", The Journal of the Computing Research Repository, Nov. 25, 2016, 10 Pages.

Mhalla, et al., "SMC Faster RCNN: Toward a Scene-Specialized Multi-Object Detector", The Journal of the Computing Research Repository, Jun. 30, 2017, 15 Pages.

Nikishaev, Andrey, "Simple Demo of Using Pyqt, Opencv and Haar Cascades for Face Detection in Real-Time", Retrieved From: https://github.com/creotiv/object_detection_projects/tree/master/face_detection_with_opencv_and_pyqt, Retrieved on: Jan. 9, 2020, 2 Pages.

Nikishaev, Andrey, "Traffic Counting Example Based on Opencv Object Detection with Background Subtraction", Retrieved From: https://github.com/creotiv/object_detection_projects/tree/master/opencv_traffic_counting, Retrieved on: Jan. 9, 2020, 3 Pages.

Oh, et al., "Adversarial Image Perturbation for Privacy Protection—A Game Theory Perspective", The Journal of the Computing Research Repository, Mar. 28, 2017, 17 Pages.

Quoc, et al., "Privapprox: Privacy-Preserving Stream Analytics", In Proceedings of the USENIX Annual Technical Conference, Jul. 12, 2017, pp. 659-672.

Ra, et al., "P3: Toward Privacy-Preserving Photo Sharing", In Proceedings of the 10th USENIX Symposium on Networked Systems Design and Implementation, Apr. 2, 2013, pp. 515-528.

Raval, et al., "Olympus: Sensor Privacy Through Utility Aware Obfuscation", In Proceedings of the Privacy Enhancing Technologies, vol. 2019, Issue 1, Dec. 24, 2018, pp. 5-25.

Raval, et al., "What You Mark Is What Apps See", In Proceedings of the 14th Annual International Conference on Mobile Systems, Applications, and Services, Jun. 25, 2016, pp. 249-261.

Redmon, et al., "YOLO9000: Better, Faster, Stronger", In Journal of Computing Research Repository, Dec. 25, 2016, 9 Pages.

Redmon, et al., "You Only Look Once: Unified, Real-Time Object Detection", In Journal of Computing Research Repository, Jun. 8, 2015, 9 Pages.

Redmond, et al., "YOLOv3: An Incremental Improvement", In the Journal of the Computing Research Repository, Apr. 8, 2018, 6 Pages.

Ren, et al., "Faster R-CNN: Towards Real-time Object Detection with Region Proposal Networks", In the Journal of the Computing Research Repository, Jun. 4, 2015, 10 Pages.

Saroiu, et al., "An Analysis of Internet Content Delivery Systems", In Proceedings of the 5th Symposium on Operating Systems Design and Implementation, vol. 36, Issue SI, Dec. 2002, pp. 315-327.

Satyanarayanan, et al., "Edge Analytics in the Internet of Things", In Journal of IEEE Pervasive Computing, vol. 14, Issue 2, Apr. 23, 2015, pp. 24-31.

Satyanarayanan, et al., "The Case for VM-Based Cloudlets in Mobile Computing", In Proceedings of the IEEE Pervasive Computing, vol. 8, Issue 4, Oct. 6, 2009, pp. 14-23.

Schiff, et al., "Respectful Cameras: Detecting Visual Markers in Real-Time to Address Privacy Concerns", In Proceedings of the IEEE/RSJ International Conference on Intelligent Robots and Systems, Oct. 29, 2007, pp. 971-978.

Shen, et al., "Fast Video Classification Via Adaptive Cascading of Deep Models", In the Journal of the Computing Research Repository, Nov. 20, 2016, 9 Pages.

Sodagar, Iraj, et al., "The MPEG-DASH Standard for Multimedia Streaming Over the Internet", In Proceedings of the IEEE MultiMedia, vol. 18, Issue 4, Nov. 15, 2011, pp. 62-67.

Sun, et al., "Deep Convolutional Network Cascade for Facial Point Detection", In Proceedings of the IEEE Conference on Computer Vision and Pattern Recognition, Jun. 23, 2013, pp. 3476-3483.

Uchida, Yusuke, "Keras Implementation of a CNN Network for Age and Gender Estimation", Retrieved From: https://github.com/yu4u/age-gender-estimation, Apr. 9, 2017, 6 Pages.

Vilk, et al., "SurroundWeb: Mitigating Privacy Concerns in a 3D Web Browser", In Proceedings of the IEEE Symposium on Security and Privacy, May 17, 2015, pp. 431-446.

Viola, et al., "Rapid Object Detection Using a Boosted Cascade of Simple Features", In Proceedings of the IEEE Computer Society Conference on Computer Vision and Pattern Recognition, vol. 1, Dec. 8, 2001, pp. 511-518.

Wang, et al., "A Scalable and Privacy-Aware iot Service for Live Video Analytics", In Proceedings of the 8th ACM on Multimedia Systems Conference, Jun. 20, 2017, pp. 38-49.

Wiegand, et al., "Overview of the H.264/AVC Video Coding Standard", In Journal of IEEE Transactions on Circuits and Systems for Video Technology, vol. 13, Issue 7, Jul. 2003, pp. 560-576.

Yu, et al., "BDD100K: A Diverse Driving Video Database with Scalable Annotation Tooling", In the Journal of the Computing Research Repository, May 12, 2018, 16 Pages.

Zhang, et al., "Live Video Analytics at Scale with Approximation and Delay-Tolerance", In Proceedings of the 14th USENIX Symposium on Networked Systems Design and Implementation, Mar. 27, 2017, pp. 377-392.

Zhao, et al., "ICnet for Real-Time Semantic Segmentation on High-Resolution Images", In Journal of the Computing Research Repository, Apr. 27, 2017, 9 Pages.

Zivkovic, et al., "Efficient Adaptive Density Estimation per Image Pixel for the Task of Background Subtraction", In Journal of the Pattern Recognition Letters, vol. 27, Issue 1, Jan. 6, 2006, pp. 773-780.

"International Search Report and Written Opinion issued in PCT Application No. PCT/US21/013522", dated Mar. 24, 2021, 11 Pages.

* cited by examiner

PRIVACY-PRESERVING VIDEO ANALYTICS

BACKGROUND

A smart city is an urban area that uses different types of electronic sensors, such as Internet of Things (IoT) sensors, to collect data and use insights gained from that data to manage assets, resources, and services. Data may be collected from citizens, devices, and assets. The data is processed and analyzed. The data can be used to monitor and manage traffic and transportation systems, power plants, utilities, water supply networks, waste management, crime detection, information systems, schools, libraries, hospitals, and other community services. Some smart city applications, ranging from traffic management to public-safety alerts, rely on live analytics of video from surveillance cameras in public spaces. However, a growing number of government regulations stipulate how data collected from these cameras must be handled to protect citizen's privacy. Blacklisting objects from the video streams, that is defining what cannot be seen, attempting to remove what cannot be seen, and displaying everything else, is error prone and often leads to a violation of privacy.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A system can include object detector circuitry to identify which classes of objects are present in video data. The system can include processing circuitry to, for each class of the classes identified in the video data, generate respective video streams that include objects of the class and exclude objects not of the class. The processing circuitry can provide each of the respective video streams to a content distribution network.

The object detector circuitry can be further configured to, for each of the classes, identify pixels of each frame of the video data that correspond to an object of that class. The respective video streams can include pixel data from the video data within bounding boxes, ellipses, or silhouettes of objects of that class and the pixel data corresponding to pixels outside the bounding boxes, ellipses, or silhouettes redacted. The object detector circuitry can be further configured to provide, with each frame of the video data, metadata indicating, for each object identified, the class identified and a respective confidence value for that class.

The device can further include encryption circuitry to encrypt each of the respective video streams using different, respective encryption keys before providing each of the respective video streams to the content distribution network. The respective video streams can further include pixel data determined to correspond to background redacted therefrom.

The device can further include compression circuitry to compress each of the respective video streams before providing each of the respective video stream to the content distribution network. The device can further include communications circuitry to receive a request for the video stream of that class and generate a request to the object detector circuitry to identify objects of that class in the video data. The object detector circuitry can be further configured to, in response to receiving the request, generate the video stream of that class.

The request for the video stream is from a policy engine that is separate from the content distribution network. The policy engine can verify a user is authorized to view the video stream of that class before transmitting the request. The object detector circuitry can be further configured to implement a convolutional neural network model to identify which classes of objects are present in the video data.

A non-transitory machine-readable medium can include instructions that, when executed by a server, cause the server to perform operations. The operations can include identifying which classes of objects are present in video data. The operations can include, for each class of the classes identified in the video data, generating respective video streams that include objects of the class and exclude objects not of the class. The operations can include providing each of the respective video streams to a content distribution network.

The operations can include, for each of the classes, identify pixels of each frame of the video data that correspond to an object of that class. The respective video streams can include pixel data from the video data within bounding boxes, ellipses, or silhouettes of objects of that class and the pixel data corresponding to pixels outside the bounding boxes, ellipses, or silhouettes redacted. The operations can further include providing, with each frame of the video data, metadata indicating, for each object identified, the class identified and a respective confidence value for that class.

A method for providing a stream of video data in a privacy preserving manner can include performing operations of the machine-readable medium. The operations can include encrypting each of the respective video streams using different, respective encryption keys before providing each of the respective video streams to the content distribution network. The respective video streams further include pixel data determined to correspond to background redacted therefrom.

The operations can further include compressing each of the respective video streams before providing each of the respective video stream to the content distribution network. The operations can further include receiving a request for the video stream of the class. The operations can further include generating the video stream that includes only objects of the class.

DETAILED DESCRIPTION

Figure 1:
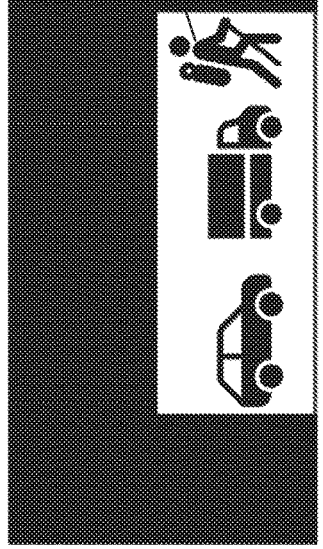
FIG. 1 illustrates, by way of example, a diagram of a comparison of whitelisting and blacklisting approaches to image data.

In the following description, reference is made to the accompanying drawings that form a part hereof and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Embodiments can advantageously improve privacy of smart city or other video analysis applications. Embodiments can help balance privacy and utility of video analytics by redacting video (e.g., in near real-time or real-time) for smart city and other applications. By whitelisting objects, or blocking by default, scalable video analytics that have improved privacy-preserving performance characteristics than blacklisting can be realized. Whitelisting reduces (e.g., minimizes) a risk of an object detection error leading to a privacy violation. Whitelisting also helps embodiments scale to a large and diverse set of applications. In particular, whitelisting reduces the bandwidth and compute resources needed to generate object-specific video streams. Experiments show that compared to blacklisting objects, whitelisting yields significantly improved privacy performance (up to ~5,000× increase in privacy performance over blacklisting) and bandwidth savings (up to ~5.5×) with negligible utility loss. Any utility loss can be mitigated, such as by including metadata with a video stream.

Surveillance cameras are a ubiquitous presence in public spaces. To take advantage of these cameras, some have proposed several video-analytics frameworks that can ingest video data and perform object detection and tracking on behalf of video analytics applications. Examples of such frameworks include traffic management, pedestrian detection, and public-safety alerts. Cameras are an appealing data source for smart city initiatives because they can support a wide range of applications and installing cameras is relatively easy. In comparison, dedicated sensing infrastructure, such as in-road induction loops or radio frequency identification (RFID) tags and readers, support a far smaller set of use-cases and are more difficult to deploy.

The convenience of surveillance cameras comes at a significant cost by eroding citizens' privacy. Cameras collect data indiscriminately and, as a result, they capture information that is both not essential to an application and prone to abuse. Governments around the world have reacted to the privacy threat posed by surveillance technologies. For example, the European Union passed the General Data Protection Regulations (GDPR) and United States cities have bans on face recognition. Preserving the utility of video based smart-city applications, while remaining compliant with privacy-protecting regulations requires technical solutions for controlling how applications extract information from video data.

Smartphones and other computers can control access to video data, but they typically support only coarse-grained permissions, such as by allowing full access or denying all access to data generated by a camera. Prior work has explored applying the principle of least privilege to video using fine grained access-control mechanisms. These systems rely on computer techniques to detect objects in real-time or near real-time. These systems then use the detected objects to transform raw video data before sharing it with an application. One approach to transforming video data is blacklisting or sharing-by-default, which redacts objects that a video consumer is not allowed to view (e.g., placing a black box over human faces). A different, and improved, approach is whitelisting or blocking-by-default, which shares only the objects that a video consumer is explicitly allowed to view (e.g., blacking out everything except for objects of an authorized, detected class).

The whitelisting techniques herein provide a solid foundation for bringing smart city infrastructure into compliance with privacy regulations. Prior work was designed for smartphones and other computers, in which a trusted kernel can transform video data for a small number of local applications (often just one). In contrast, surveillance-camera data circulates through a distributed system consisting of resource-limited edge devices and a potentially diverse and large set of remote video-consuming applications.

As previously discussed, embodiments provide a privacy-preserving framework for surveillance-camera videos. Three challenges faced by embodiments can include edge device compute limitations, edge device bandwidth limitations, and a large and diverse set of video consumers for smart city applications. A block-by-default approach of embodiments helps preserve privacy in the face of these challenges.

To limit the size of a trusted computing base (a base of entities, whether users or devices authorized to view video), embodiments can redact video from a device (e.g., a server) on or near the edge, such as by using off-the-shelf object-detection models. However, performing object detection on resource-limited edge devices in near real-time often means using weaker models. Weaker models are more prone to false negatives (e.g., missing a present object) than false positives (e.g., misclassifying a present object), and these errors can lead to privacy violations. Thus, embodiments block video content by default, or whitelist objects, to reduce the likelihood of a model error causing a privacy violation. Blocking by default (whitelisting) also helps embodiments scale to a large and diverse set of applications as discussed further elsewhere herein.

Modern object-detection models like YOLO (detailed in a paper by Joseph Redmon, Santosh Kumar Divvala, Ross B. Girshick, and Ali Farhadi titled "You only look once: Unified, realtime object detection." CoRR, abs/1506.02640, 2015) can detect tens of object categories, such as people, cars, and traffic lights. Under share-by-default (blacklisting), embodiments would have to create a uniquely-redacted stream for each combination of categories. Creating all of these streams requires a prohibitive amount of computation and bandwidth for an edge node. Note that even when the number of permission combinations for active near real-time applications is small, the diversity of authorized video consumers may grow over time. For example, at the time a camera captures a video, no active application may need to view bicycles. However, at a later time, a city's road-planning commission may wish to characterize bicycle traffic using archived videos.

To help alleviate this issue, embodiments can create a separate video stream for each object category. Each video stream can include only objects of its corresponding category (e.g., the bicycle stream only shows bicycles). This approach helps embodiments scale in at least three ways. First, the maximum number of streams that can be generated is equal to the number of detected object categories (not the number of category combinations) (plus one to account for a background stream that includes all objects or parts of a scene that are not part of a detected class). Second, because most streams are mostly (or entirely) blacked out, individual streams compress well with minimum effort. Third, by breaking object streams into segments and encrypting the segments with unique keys, embodiments can decouple serving encrypted video data from authorization decisions (e.g., distributing decryption keys). This allows video transfers to be handled by conventional, scalable web technologies like content distribution networks (CDNs) without expanding the trusted computing base or undermining privacy. An application authorized to view multiple objects can simply retrieve the appropriate keys and encrypted video segments. The application can then overlay the decrypted videos to compose a coherent, multi-object stream.

Reference will now be made to the FIGS. to describe further details of the technical solutions to the technical problems provided by embodiments. The description proceeds with an analysis of video analytics that provide a basis to understand improvements for a system for privacy-preserving object streaming that is presented starting at about FIG. 4.

FIG. 1 illustrates, by way of example, a diagram of a comparison of whitelisting and blacklisting approaches to image data. In FIG. 1 an original image 102 is provided in an upper left corner. Below that is a table 104 comparing false positive and false negative for a blacklist approach and a whitelist approach for car and truck objects.

In the upper left of the table is an image 106 of a false positive in a whitelist approach. The whitelist specifies the objects to be displayed (not redacted) in the image and all other objects are to be redacted. Thus, a false positive in the whitelist approach means an object that is not on the whitelist is shown in the image. In the example of FIG. 1, a whitelist false positive includes a person mistaken for a car by an object detector (see FIG. 4).

In the upper right of the table is an image 108 of a false positive in a blacklist approach. The blacklist specifies the objects that are to be redacted and all other objects in the image are to be displayed. Thus, a false positive in the blacklist approach means an object that is not to be redacted is not shown in the image. In the example of FIG. 1, the person is mistaken for the car, and is therefore redacted.

In the lower left of the table is an image 110 of a false negative in a whitelist approach. Since the whitelist specifies the objects that are to be shown and all other objects in the image are to be redacted, a false negative in the whitelist approach means an object to be shown is redacted. In the example of FIG. 1 a whitelist false negative includes the car not being detected as a car and therefore being redacted.

In the lower right of the table is an image 112 of a false negative in a blacklist approach. Since the blacklist specifies the objects that are to be redacted and all other object in the image are to be displayed, a false negative in the blacklist approach means an object to be redacted is displayed. In the example of FIG. 1, the truck is not detected as a truck and is therefore displayed.

Consider whitelisting, where detecting a person and misclassifying her as a car constitutes a false positive (upper left of the table), leading to privacy loss for the person. Consider further that not detecting a car in the scene constitutes a false negative, which leads to utility loss for the vehicle-counting application (lower left of the table). For blacklisting, detecting a car as a person constitutes a false positive, which leads to utility loss for the vehicle-counting application. Alternatively, not detecting a person in the scene constitutes a false negative for a blacklisting approach, which leads to privacy loss.

The relative prevalence of false positives and false negatives thus dictates whether whitelisting or blacklisting can lead to greater or lesser privacy loss. This is usually measured using precision and recall, which can be defined as follows. Precision measures how accurate a detector is (e.g., a proportion of detections that are correct). Precision can be determined using the following equation: precision=TP/(TP+FP), where TP stands for True Positive and FP stands for false positive. Recall measures the fraction of ground truth objects that are both correctly detected and labeled by the detector. Recall can be determined using the following equation: recall=TP/(TP+FN), where FN stands for false negative. Increasing precision involves decreasing the number of false positives (FP). On the other hand, to increase recall, the number of false negatives (FN) needs to decrease.

Figure 2:
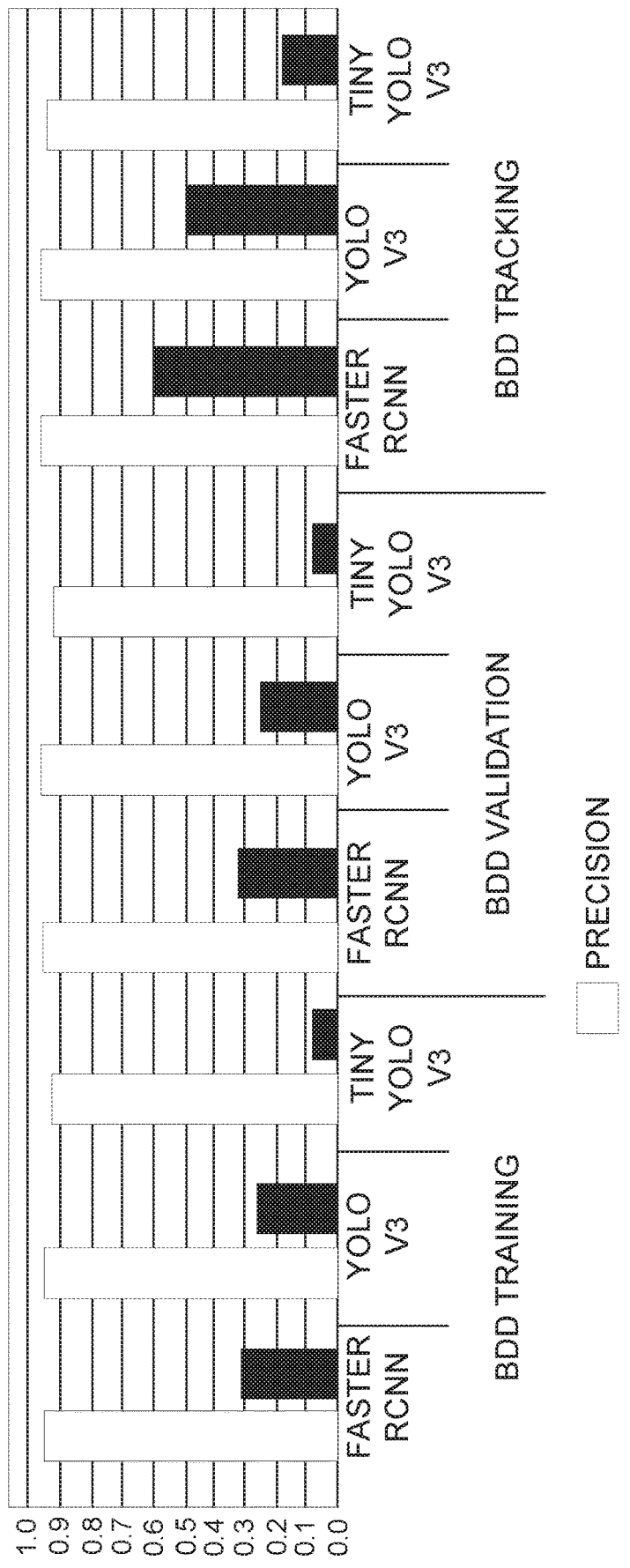
FIG. 2 illustrates, by way of example, a plot of precision and recall of three object detection techniques.

FIG. 2 illustrates a plot of precision and recall of three object detection techniques: Faster-RCNN (recurrent convolutional neural network), YOLO ("You Only Look Once") version 3 (v3), and Tiny-YOLO v3, on three videos generated from the training (bdd-training), validation (bdd-validation), and tracking (bdd-tracking) data from a Berkeley Driving Dataset (BDD). These three videos collectively contain 1,100 hours of labeled video data, consisting of 100,000 video sequences recorded at 1 frame-per-second (FPS) from multiple moving vehicles. The videos contain labeled objects corresponding to 10 classes. Faster-RCNN and YOLO v3 are relatively-heavy full-scale models, while Tiny-YOLO is a lightweight approximation of the full-scale YOLO model. The three models were not re-trained and their default weights obtained by training on a common objects in context (COCO) dataset, which has 80 object classes, were used.

While all three detectors yield very high precision (~0.93-0.96), the measured recall is significantly lower ~0.07-0.6). For all three videos also observe that the most-complex model, Faster-RCNN, yields the highest recall, followed by YOLO and Tiny-YOLO.

FIG. 2 illustrates that state-of-the-art object detectors tend to have significantly higher precision than recall. This means that false negatives are more common than false positives for state-of-the-art object-detection techniques. This implies that object detectors tend to miss more objects in a scene than mis-classify detected objects. As indicated by FIG. 2, this problem is worse for low-cost detectors like Tiny-YOLO, which have significantly lower recall (~3× lower). Tiny-YOLO is often used in resource-scarce settings like cameras and edge-computing platforms.

Decreasing false positives is an easier problem to solve than decreasing false negatives, as it involves correctly classifying detected objects. This is supported by the results in FIG. 2, which indicate that light-weight detectors like Tiny-YOLOv3 have similar precision to computationally-heavy detectors like YOLO and Faster-RCNN. On the other hand, reducing false negatives is more difficult, as it involves both detecting the missed objects as well as classifying them. While precision and recall are useful metrics to capture the prevalence of detection errors, not all such errors contribute to either privacy or utility loss.

A false positive $FP_{S \to R}$, mis-labeling a sensitive class $S \in \beta$ as a relevant class $R \in \omega$ causes privacy loss for whitelisting where $\beta$ is the set of all sensitive classes and w is the set of all relevant classes. A false positive $FP_{R \to S}$, mislabeling a relevant class $R \in \omega$ as a sensitive class $S \in \beta$ causes utility loss for blacklisting. On the other hand, a false negative $FN_S$ not detecting a sensitive class $S \in \beta$ causes privacy loss for blacklisting. Alternatively, a false negative $FN_R$ not detecting a relevant class $R \in \omega$ causes utility loss for whitelisting. Privacy loss, P, can be defined as the fraction of objects belonging to sensitive classes $S \in \beta$ disclosed to the consumer. Utility loss, U, can be defined as the fraction of objects belonging to relevant classes $R \in \omega$ withheld from the consumer.

Using these definitions, P and U, can be determined for both whitelisting (WL) and blacklisting (BL). Privacy loss for WL, is denoted as $P_{WL}$, privacy loss for BL is denoted as $P_{BL}$, utility loss for WL is denoted as $U_{WL}$, and utility loss for BL is denoted as $U_{BL}$.

$$P_{WL} = \frac{\sum_{S \in \beta, R \in \omega} FP_{S \to R}}{\sum_{S \in \beta} TP_S + FN_S}$$

$$P_{BL} = \frac{\sum_{S \in \beta} FN_S}{\sum_{S \in \beta} TP_S + FN_S}$$

$$U_{WL} = \frac{\sum_{R \in \omega} FN_R}{\sum_{R \in \omega} TP_R + FN_R}$$

$$U_{BL} = \sum_{S \in \beta, R \in \omega} FP_{R \to S} / \sum_{R \in \omega} TP_R + FN_R$$

Based on the foregoing, false positives are relatively rare as modern object detectors have high precision. When using whitelisting, only a small subset of false positives, mis-labeling a sensitive class $S \in \beta$ as a relevant class $R \in \omega$ causes privacy loss. False negatives are more common than false positives as modern object detectors have relatively low recall. Although recall can be increased by training on specialized data, it is a significantly more difficult problem than increasing precision. When using blacklisting, all false negatives not detecting a sensitive class S E p cause privacy loss.

Figure 3:
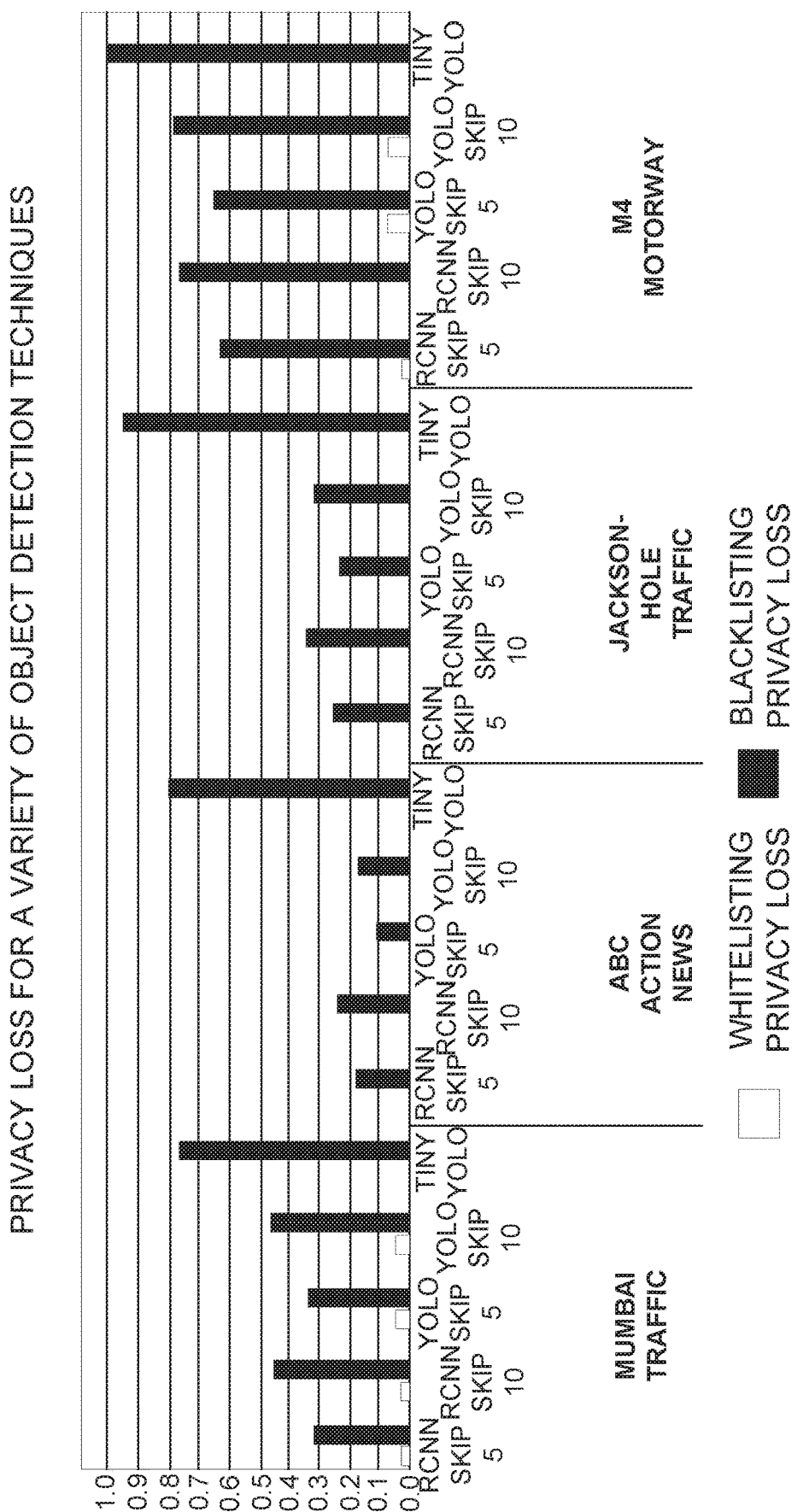
FIG. 3 illustrates, by way of example, a plot that compares privacy loss between whitelisting and blacklisting, for a variety of object detection techniques.

FIG. 3 illustrates, by way of example, a plot that compares privacy loss between whitelisting and blacklisting, for a variety of object detection techniques. This FIG. along with prior insights indicate that when using modem object-detection methodologies at ingest time, whitelisting can yield significantly lower privacy loss than blacklisting. FIG. 3 shows that whitelisting yields significantly lower percent-age privacy loss, as compared to blacklisting. However, whitelisting also suffers potentially higher utility loss (e.g., ~38-87%) as compared to blacklisting (e.g., ~0.02-0.09%).

Consider, however, that privacy loss is permanent, while utility loss can be recovered. Consider an example in which an object belonging to a sensitive class, S, is accidentally disclosed or not redacted. In this case, the privacy loss caused is permanent and cannot be reversed. On the other hand, if the detection of a low confidence object belonging to a relevant class, R, is withheld from the consumer, it can be recovered by post-processing the frame with a more accurate object detector. This can be achieved by, for example, providing a consumer with metadata indicating low confidence relevant objects. A consumer can then request post-processing to recover the lost utility.

Thus, a bias towards privacy by using whitelisting over blacklisting helps create privacy-preserving video streams. Although embodiments support blacklisting, whitelisting, or a combination thereof embodiments favor whitelisting. In subsequent sections, added benefits of whitelisting, in terms of both administering and distributing privacy-preserving video streams to multiple consumers and encoding the video streams are discussed.

Figure 4:
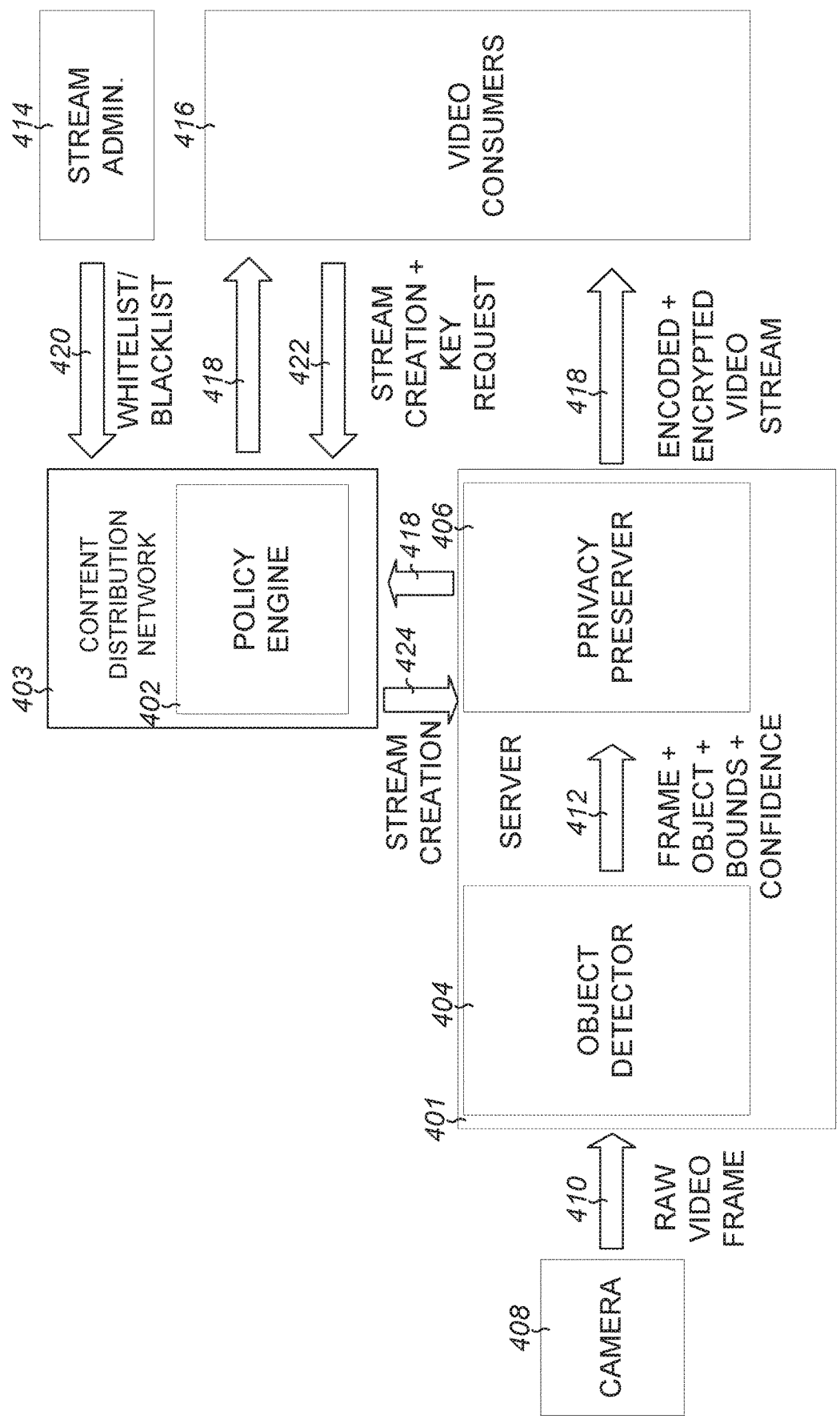
FIG. 4 illustrates, by way of example, a diagram of an embodiment of a system for privacy preserving video streaming.

FIG. 4 illustrates, by way of example, a block flow diagram of an embodiment of a system 400 for privacy preserving video streaming. The system 400 can be compatible with existing applications and CDNs. The system 400 as illustrated includes a camera 408, a content distribution network (CDN) 403, a server 401, an administrator 414, and a video consumer 416.

A camera 408 is a device for recording visual images in the form of photographs, film, or other video signals. In some embodiments, the camera 408 can be individually mounted to a building, street corner, stoplight, or other location. In other embodiments, the camera 408 can be a part of a device with more functionality, such as a smartphone. In yet some other embodiments, the camera 408 can be part of an Internet of Things (IoT) device or the like.

The camera 408 provides a raw video frame 410 to the system 400. The raw video frame 410 includes data indicating a view of a scene. In general, the raw video frame includes a 2D matrix of pixel-values (e.g., grayscale, color, multi-spectral, or the like). The raw video frame 410 can include metadata that indicates one or more of a name of a video that includes the raw video frame 410, a format of the raw video frame (e.g., audio video interleave (AVI), flash video format (FLV), Windows media Video (WMV), Apple QuickTime Movie (MOV), Moving Pictures Expert Group 4 (MP4), among others), a codec type, a file size, a duration of the associated video, a bit rate, a date the video was recorded, a device that generated the video, a location at which the video was captured, or the like.

The server 401 as illustrated includes an object detector 404 and a privacy preserver 406. The object detector 404 can ingest the video frame 410. The ingesting can include decoding, decompressing, or a combination thereof the raw video frame 410. The object detector 404 detects an object in the raw video frame 410. There are many types of object detectors and many are Neural Network (NN) or Machine Learning (ML) based. Examples of ML object detection techniques include Viola-Jones detection based on Haar features, Scale-Invariant Feature Transform (SIFT), Histogram of Oriented Gradients (HOG) features, among many others. Example of NN object detection techniques include Faster-RCNN, You Only Look Once (YOLO), and Tiny-YOLO, Recurrent Convolutional NN (R-CNN), Fast R-CNN, single shot multibox detector (SSD), among many others. In some embodiments, the object-detector 404 supports frame skipping (performing detection only once every n frames). In some embodiments, the server 401 can be tightly integrated with the camera 408. The camera 408 can include an onboard computer and processing circuitry (e.g., an application specific integrated circuit or other processing circuitry) for performing hardware accelerated object detection and video encoding (or other operations performed by the object detector 404, the privacy preserver 406, or other operation performed by the server 401).

In some embodiments, the object detector 404 can perform object tracking after object detection. Examples of object tracking techniques include point tracking, kernel tracking, and silhouette tracking. In point tracking, tracking is performed based on object position and motion. Tracking is performed by associating points across frames. Kernel tracking is similar to point tracking, but instead of using a point, the kernel tracking uses a primitive geometric shape to represent and follow the object. Silhouette tracking is sometimes called region tracking or region-based tracking. In silhouette tracking an object is modeled in the form of color histogram, object edges, or object contours. Examples of object tracking techniques include Simple Online Realtime Tracking (SORT), Multi-Domain Network (MDNET), GOTURN, Recurrent YOLO (ROLO), among others.

The object detector 404 can generate a frame identification, detected objects, object bounds (e.g., in the form of bounding boxes, silhouettes, ellipses, or the like), object classes, the prediction confidence scores, or a combination thereof at data 412. This data 412 can be generated per analyzed frame and sent to the privacy preserver 406.

The privacy preserver 406 is responsible for implementing a video streaming mechanism, and generates composable (e.g., encrypted) object specific video streams 418. These streams 418 are created based on the object detection data 412 received from the object detector 404. With access to the proper set of encryption keys, the object streams 418 can be decrypted and composed to reconstruct the video including the raw video frame 410 (e.g., in redacted form). The types of object classes encountered in a scene, generally follow a Zipfian distribution. Instead of generating streams for all the object classes which a detector can detect, the privacy-preserver 406 relies on the policy engine 402 to dynamically specify which object classes consumers (or administrators for blacklisting) are interested in. All pixels not detected as belonging to any class specified by the policy engine 402 can be encoded into a background stream.

The privacy preserver 406 can support two or more types of output for each object stream: (i) raw frames to be locally consumed by applications deployed on the edge, and (ii) encoded (e.g., H264-encoded) HTTP Live Streams (HLS) for distribution to the content distribution network (CDN) 403 that can be consumed by external consumers.

HLS encodes a video as files of a fixed-configurable duration and uses the HTTP protocol to transport these encoded files. The file-based nature of HLS makes it especially useful from a content-distribution standpoint. Fast forward MPEG (ffmpeg) can be used to generate H264-encoded HLS. All output object streams can be encrypted using AES-128 or other encryption technique. The encryption keys (e.g., 128-bit per-object stream) generated by the policy engine 402 can be provided to the server 401. To serve the HLS files, nginx can be used in conjunction with the nginx-rtmp module, which provides HLS support.

The CDN 403 as illustrated includes the policy engine 402. The policy engine 402 exposes one or more of a consumer-facing or administrator-facing application programming interface (API), called a consumer API and an administrator API, respectively. The API can be a representational state transfer (REST) API. An API is a set of rules that allow programs communicate with each other. A developer creates the API on a server and allows a client to talk to the application through the server. A REST API typically uses hypertext transfer protocol (HTTP) requests to get, put, post and delete data. A rule for a REST API is that a resource (data) is provided with a link to a Uniform Resource Locator (URL).

The administrator API allows an administrator to create or remove consumer profiles. The administrator API allows an administrator to specify object classes that a consumer is allowed to view (whitelisting), or not allowed to view (blacklisting). A variety of consumer profiles can be supported by the system 400. Three examples of consumer profiles include: (i) whitelisted: only a specified set of object classes is disclosed to the consumer, (ii) blacklisted: only a specified set of object classes is redacted from the consumer, and (iii) unredacted: a viewer is able to view a stream in its entirety.

The consumer API allows consumers to request to view a video. The consumer can specify a list of object classes. The request can be denied by the policy engine if any of the requested classes are: (i) not in the whitelist specified through the administrator API, or (ii) in the blacklist specified through the administrator API.

The policy engine 402 can be responsible for generating, revoking, and distributing encryption keys used to protect the object streams 418. The policy engine 402 can expose another API for consumers to download keys and implement authentication to verify if a consumer has access to a particular object stream.

Along with streaming per-object video streams 418, the system 400 can provide encrypted metadata corresponding to every object stream. The metadata can be encrypted (using a same key as was used to encrypt a corresponding stream). The metadata can include a list of detected objects found in the frame corresponding to the object class, the object bounds, and the confidence scores. This is useful as (i) metadata streams providing live analytics may be sufficient to enable many applications, and (ii) low-confidence object detections may be withheld from the user to prevent privacy loss. An application can then use metadata to detect the presence of such objects. Thus, an application can recover utility, by requesting that the frame be re-analyzed by a specialized object detector. The metadata can be provided using a publish-subscribe channel (e.g., a NATS-streaming publish-subscribe channel), and a separate channel can be provided for the object stream (e.g., each object stream).

In operation, a camera 408 can operate to generate the raw video frame 410. The raw video frame 410 can be provided to the server 401. The object detector 404 can identify an object, object class, object bounds, and a corresponding confidence that the object is part of the class. The identified object, object class, object bounds, or confidence can be provided to the privacy preserver 406 as the data 412.

The privacy preserver 406 can encode, encrypt, or a combination thereof, a video stream 418 that includes only objects of a specified class. The remainder of the video stream 418 can be redacted (including the background).

A video consumer 416 (an application, device, or the like) can issue a request 422 for an object-specific video stream 418 (sometimes called "object stream"). The CDN 403 can receive the request 422. The policy engine 402 can verify whether the video consumer 416 is authorized to view the object stream 418. This verification can include looking up a unique identifier of the video consumer 416 and identifying that the video consumer 416 is associated with the class of object corresponding to the object stream 418, requesting and verifying a password from the video consumer 416, or the like.

If the video consumer is authorized to view the object stream 418, the policy engine 402 can issue a request 424 for the server to generate or provide the object stream 418. The server 401 can oblige. Or, if the object stream 418 was already created and provided to the CDN 403, the CDN 403 can provide the stream 418 to the consumer 416.

The stream administrator 414 is in charge of managing access permissions of the object streams 418. The stream administrator 414 can provide the policy engine 402 with data 420 indicating unique identifiers of video consumers 416 and corresponding whitelist(s)/blacklist(s) of object classes for which the video consumer 416 is authorized to view or not view. The policy engine 402 is in charge of enforcing the access permissions indicated by the data 420.

Motivations for the system 400, with a focus on the tradeoffs of using a whitelisting approach to video redaction are now provided. Assume that the system 400 performs object detection using a surveillance camera's onboard computation or a directly connected edge server. In either case, the system 400 has a trusted computing base (TCB) that extends to all software and hardware with access to plaintext video. The size of the TCB can be reduced by performing object detection and video encoding in a secure execution environment, such as an Advanced Reduced Instruction Set Computing Machine (ARM) TrustZone or Intel Software Guard Extensions (SGX). Regardless, because edge platforms are generally more resource constrained than high-end server machines, some lightweight techniques to detect and disclose/redact objects in video streams are explored. Subsequently, how the system 400 simultaneously delivers video to multiple applications, while preserving privacy and reducing the bandwidth required by the edge site are described. Lastly, how whitelisting also simplifies application authorization is described.

Most object detectors, such as implemented by the object detector 404, are computationally-intensive and require powerful hardware accelerators like graphics processing units (GPUs) to support inference frame rates required for real-time streaming and analytics. Such powerful accelerators may often not be available on resource-constrained edge platforms.

Given that objects typically remain in the field of view of the camera 408 for at least a few frames, inference can be performed every n frames. Object tracking can be performed between detected objects between two consecutive inference steps (every n frames). In particular, what follows is an analysis of the decrease in inference time and the impact on privacy loss for various object detection techniques.

Figure 5:
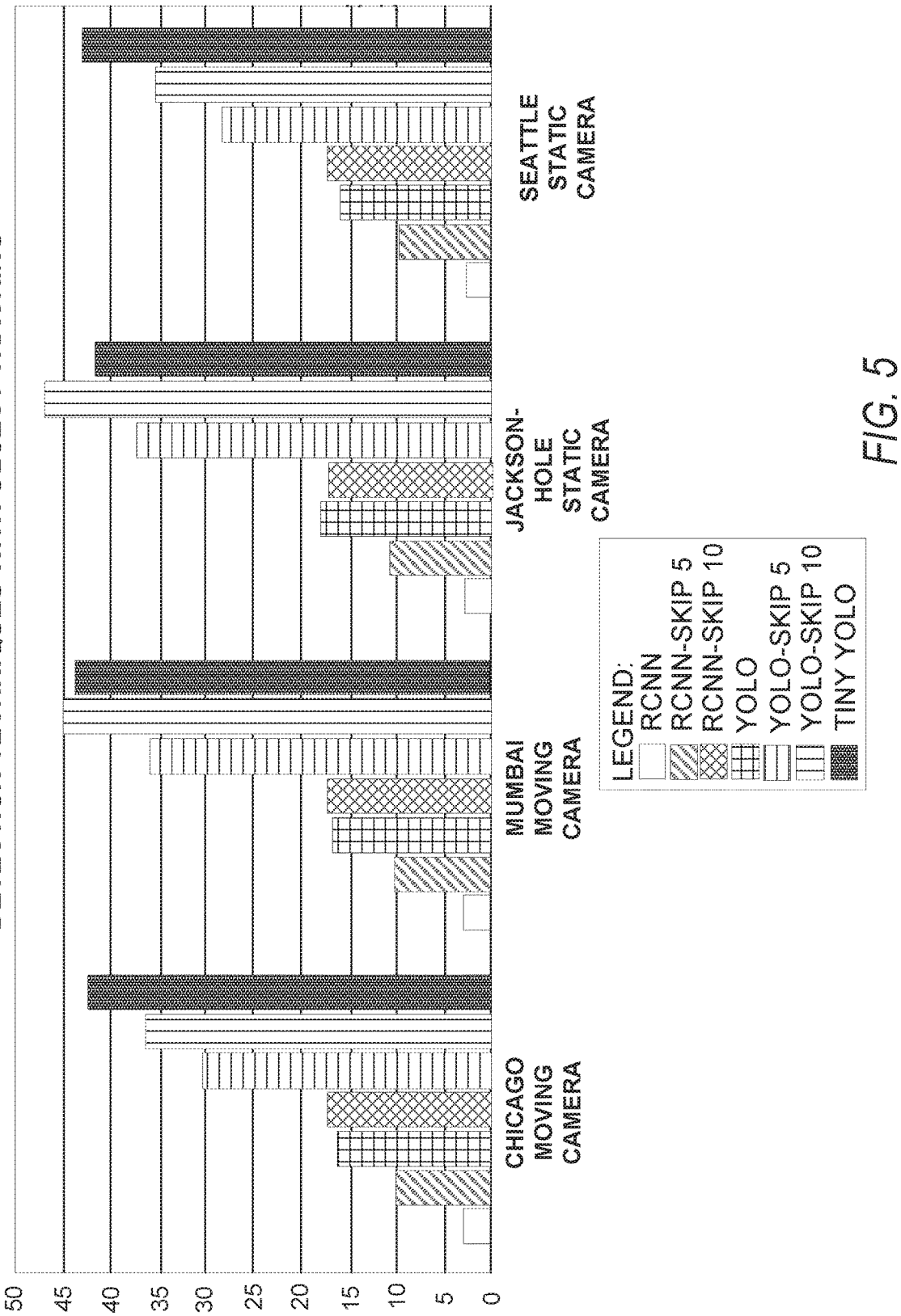
FIG. 5 illustrates, by way of example, a plot that compares the inference frame rate of some objection detection techniques.

FIG. 5 compares the inference frame rate of: (i) state-of-the-art object detectors such as Faster-RCNN and YOLO, (ii) a low-cost object detector such as Tiny-YOLO, and (iii) performing object detection every n frames using Faster-RCNN or YOLO followed by object tracking (e.g., using the SORT framework and Open Computer Vision (CV)-based trackers), for n=5 and n=10. Four videos, each with a high definition (HD) resolution of 1280×720 were used. On average, RCNN yields the lowest frame rate (~2.7 FPS), and tiny-yolo the fastest frame rate (~42 FPS). Additionally, YOLO-skip-10 can deliver a similar or faster frame rate than TinyYOLO (~36-46 FPS). Note that while RCNN, YOLO, and TinyYOLO yield frame rates independent of the video content, the frame rate for RCNN-skip-n and YOLO-skip-n is video dependent, as the tracking speed depends on the number of objects in a frame.

Figure 6:
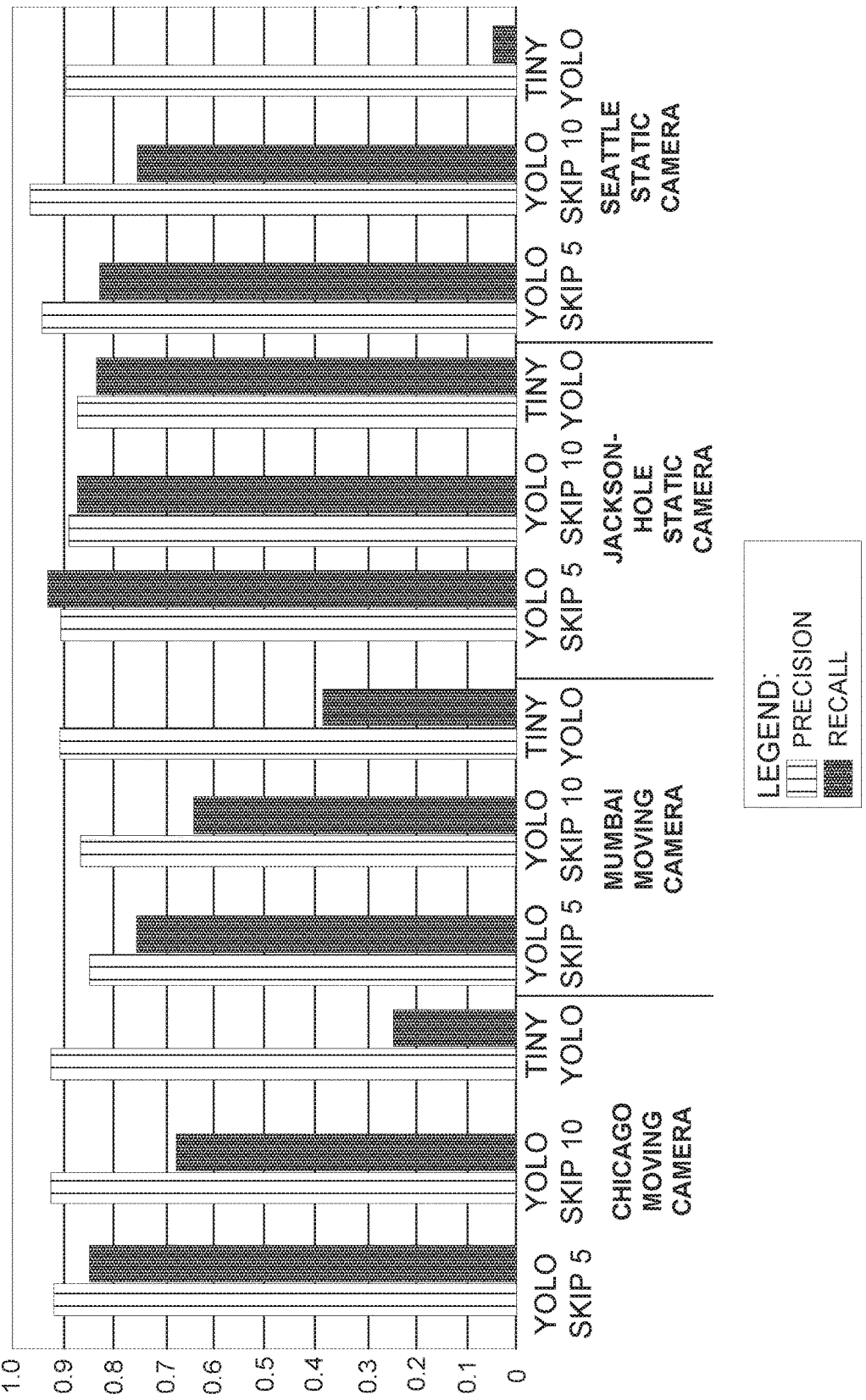
FIG. 6 illustrates, by way of example, a plot of precision and recall that for some object detection techniques.

FIG. 6 illustrates, by way of example, a diagram of a plot of precision and recall that for YOLO-skip-5, YOLO-skip-10, and tiny YOLO. To generate the plot of FIG. 6 labels generated by YOLO v3 were used as the ground truth. This works well for this comparison as all the object detection techniques compared are based on YOLO v3. In the plot of FIG. 6, YOLO-skip-n for both n=5 and n=10, yields improved precision and significantly higher recall as compared to TinyYOLO. This makes it a viable alternative for resource-constrained edge platforms. This is because it can deliver higher precision and recall than TinyYOLO, which translates to both lower privacy and utility loss, while delivering a similar or higher frame rate.

Removing sensitive information from a video as close to the source as possible can be desirable. Thus, it can be desired to perform whitelisting or blacklisting at the edge. Bandwidth is an important constraint when streaming from an edge device. The edge device that provides a video stream may be asked to stream video to human viewers or applications situated at different locations. To distribute videos at scale to multiple consumers the following distribution model can be used:

1. Video is live-streamed from a server on or near the edge to a Content-Distribution Network (CDN) 403. The CDN 403 is a geographically distributed network of proxy servers and their corresponding data centers. A goal of the CDN 403 is to provide high availability and high performance by distributing the service spatially relative to end-users.

2. Consumers 416 connect to the CDN 403 to stream the video. If no privacy-preserving transformations such as whitelisting or blacklisting are performed, then the video stream can easily be distributed to multiple consumers through a CDN 403. Alternatively, if all consumers 416 are homogeneous in terms of their viewing privileges and objectives, a single whitelisted or blacklisted stream can also be distributed through a CDN 403. However, a video stream will often have multiple consumers 416 with different objectives. Consider a smart city scenario, in which multiple consumer applications use the same camera feed. Table 1 shows five smart-city applications, each responsible for counting different types of objects in the video stream, along with the object classes that need to be disclosed or redacted based on whether whitelisting or blacklisting is used. In this scenario, a naive approach involves creating consumer-specific video streams to satisfy each consumer's requirements while also preserving privacy.

TABLE I

Example Multi-Consumer Smart-City Scenario

| Application | Whitelisted Objects | Blacklisted Objects |
|---|---|---|
| Vehicle Counting | Vehicle | Person |
| Pedestrian Counting | Person | Vehicle |
| Bicycle Counting | Bicycle | Vehicle, Person |
| Two-Wheeler Counting | Bicycle, Motorbike | Vehicle, Person |
| Surveillance | All Objects | No Objects |

Even the small scenario posed by Table I can cause the bandwidth requirement at the edge to rapidly increase as multiple consumers are added.

Figure 7:
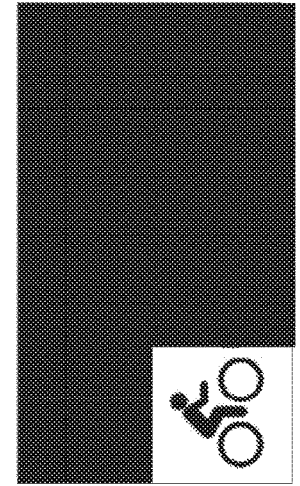
FIG. 7 illustrates, by way of example, snapshots of five redacted video streams created to satisfy each application of Table I using a whitelisting approach.
Figure 7:
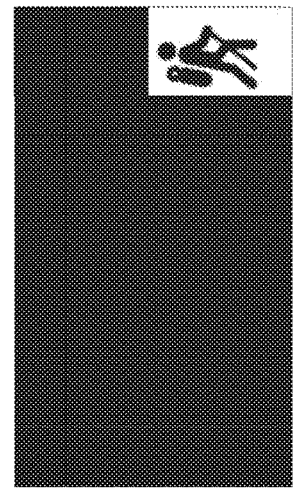
Figure 7:
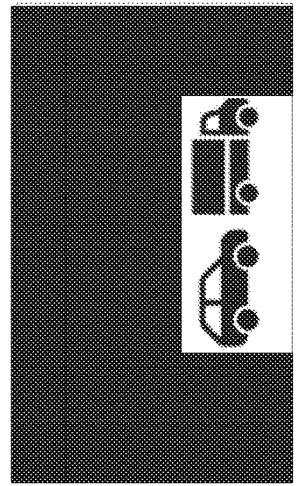
Figure 7:
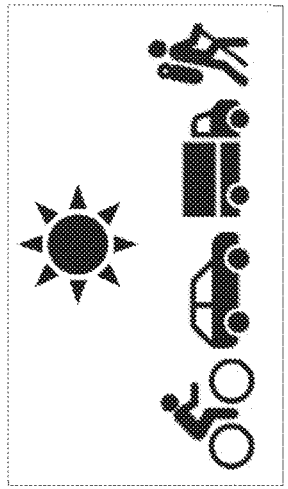
Figure 7:
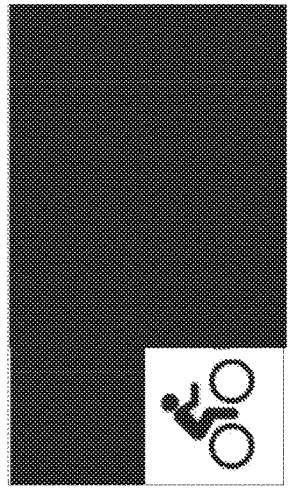
Figure 8:
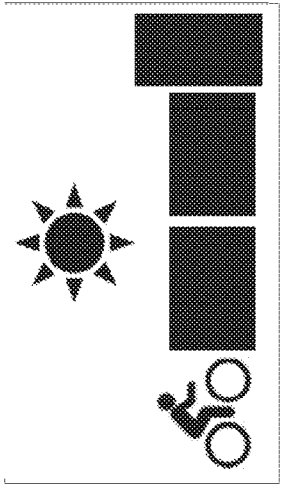
FIG. 8 illustrates, by way of example, snapshots of five redacted video streams created to satisfy each application of Table I using a blacklisting approach.
Figure 8:
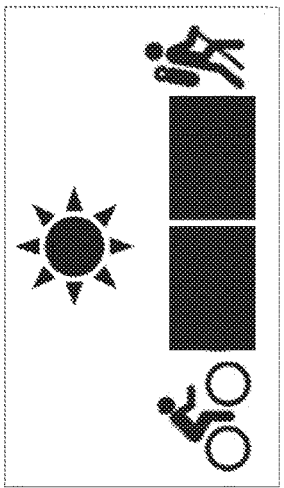
Figure 8:
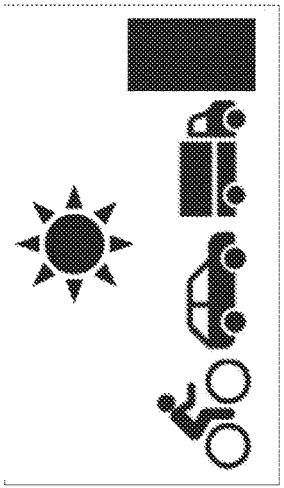
Figure 8:
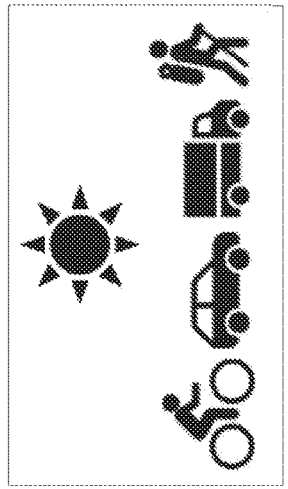
Figure 8:
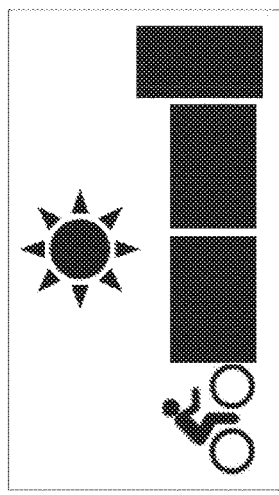

FIG. 7 illustrates, by way of example, snapshots of five redacted video streams created to satisfy each application of Table I using a whitelisting approach. FIG. 8 illustrates, by way of example, snapshots of five redacted video streams created to satisfy each application of Table I using a blacklisting approach. Each of the snapshots of the blacklisting approach of FIG. 8 contain a common background, which in the example of Table I is streamed five times from the edge. In the adverse setting, when no objects are detected as belonging to any of the blacklisted classes, each consumer application gets the same frame in its entirety. This would use up to 5× the bandwidth of a single un-redacted video stream.

If in contrast, a whitelisting approach is used, such as to preserve privacy, then some object classes may be in two or more streams. For example, as shown in FIG. 7, objects belonging to the class "bicycle" are used by the bicycle and two-wheeler counting applications, as well as the surveillance application. Thus, these objects are transmitted three times from the edge. However, this is still more efficient than blacklisting, as the background can be blacked out and not disclosed to the viewers.

Video frames are typically encoded and transmitted in a compressed format such as motion joint photographic experts group (JPEG) format or H264 format. These encoding formats encode information in the frequency domain. Hence, blacked-out regions do not contain any information or contribute to streaming bandwidth.

Consider a pixel $p_{i,j}^t$ of a frame t as the smallest unit of information in a video stream with resolution (W, H), where $0<i<W$, $0<j<H$ and t, W, H$\in Z^+$. By using an object detector, if a pixel lies inside an extent (e.g., ellipse, bounding box, silhouette, or the like) for an object, it can be classified as: (i) belonging to that object class, else (ii) as belonging to the background. Therefore, to distribute the video stream in a privacy-preserving and bandwidth-efficient manner a method can be performed based on the assumptions: each pixel $p_{i,j}^t$ in a frame t of the video stream contains useful information. Therefore to communicate all the useful information while minimizing bandwidth, each pixel in the frame can be encoded only once; and each pixel $p_{i,j}^t$ in the frame t can be made accessible only to consumers who are autho-rized to view it (e.g., if it belongs to a whitelisted class R$\in w_k$ or does not belong to a blacklisted class S$\in \beta_k$ for the consumer $C_k$).

Figure 9:
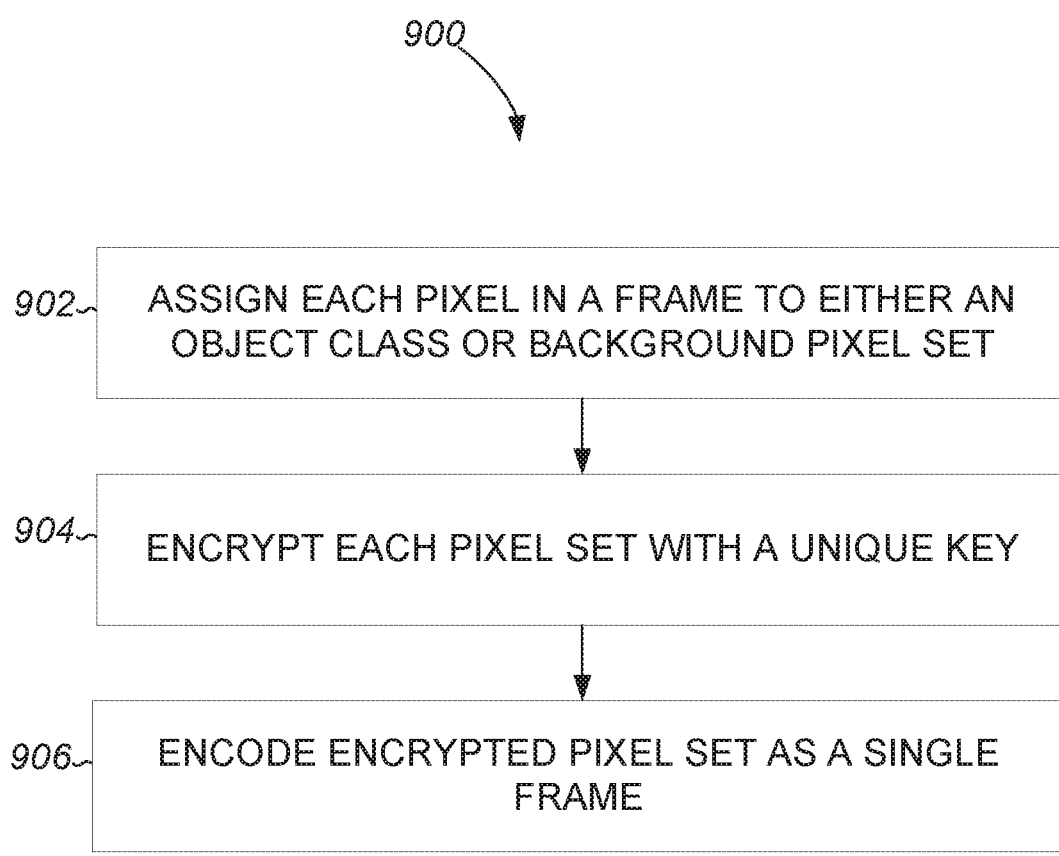
FIG. 9 illustrates, by way of example, a flow diagram of an embodiment of a method for preserving privacy in a video stream while still allowing access to an authorized viewer of the video stream.

FIG. 9 illustrates, by way of example, a flow diagram of an embodiment of a method 900 for preserving privacy in a video stream while still allowing access to an authorized viewer of the video stream. The method 900 as illustrated includes assigning each pixel $p_{i,j}^t$ in frame t to a set $\Gamma_c$, where $c \in \{\Omega, background\}$, and $\Omega$ represents all the object classes that the object detector 404 can detect, at operation 902; encrypt each pixel set $\Gamma_c$ with a unique key $k_c$, at operation 904; and encode all the encrypted pixels $p_{i,j}^n$ in each pixel set as a respective single frame, at operation 906.

Using this method 900, each encrypted video stream can be sent to multiple consumers, such as through a CDN. Because each set of pixels $\Gamma_c$ is encrypted with its own key $k_c$, only consumers with the correct key will be able to decrypt (and properly decode) the corresponding pixels to recover the original vide stream. Using the method 900, viewers can see only what they are authorized to see.

The method 900 effectively converts the video-stream distribution problem into one of key management. Combining this with the knowledge of whitelisted classes per consumer, each consumer can be authenticated and provided with the set of keys required to view their relevant sets of pixels. The method 900 (i) preserves privacy as each viewer can only see objects belonging to their whitelisted classes, (ii) preserves bandwidth as each pixel is transmitted fewer times from the edge, and (iii) reduces computational costs as each pixel is only encrypted and encoded based on the number of classes to which that pixel maps.

Note how the method 900 is blacklisting or whitelisting agnostic. The method 900 can be used to generate a blacklisted stream, by providing a consumer $C_k$ all the keys $k_c$, for all classes not on the blacklist $\forall_C \notin \beta_k$.

Unlike the method 900, typical video-streaming techniques first perform encoding, and then encrypt the encoded data. This is, at least in part, because performing encryption on raw frames can destroy redundant information in a video frame. The redundant information allows for more efficient compression and encoding of the video. Therefore, embodiments can perform encoding followed by encryption.

Embodiments can generate N+1 encrypted video streams, where N represents the number of object classes in $\Omega$. A stream can be generated for each object class c, creating N video streams, and an additional stream can be generated for the background (any pixels determined to not be part of a class). Each object stream can include all the pixels $p_{i,j}^t \in \Gamma_c$ corresponding to objects detected as belonging to a particular class c. Each object stream can be encrypted with an object-class-specific key $k_c$. N can be dynamically changed based on the object classes that are to be detected, such as can be based on application white/blacklisting requirements. Embodiments can also create a residual background stream, which contains all the pixels not assigned to any object class. This background stream can be encrypted with a unique key $k_{background}$.

Figure 10:
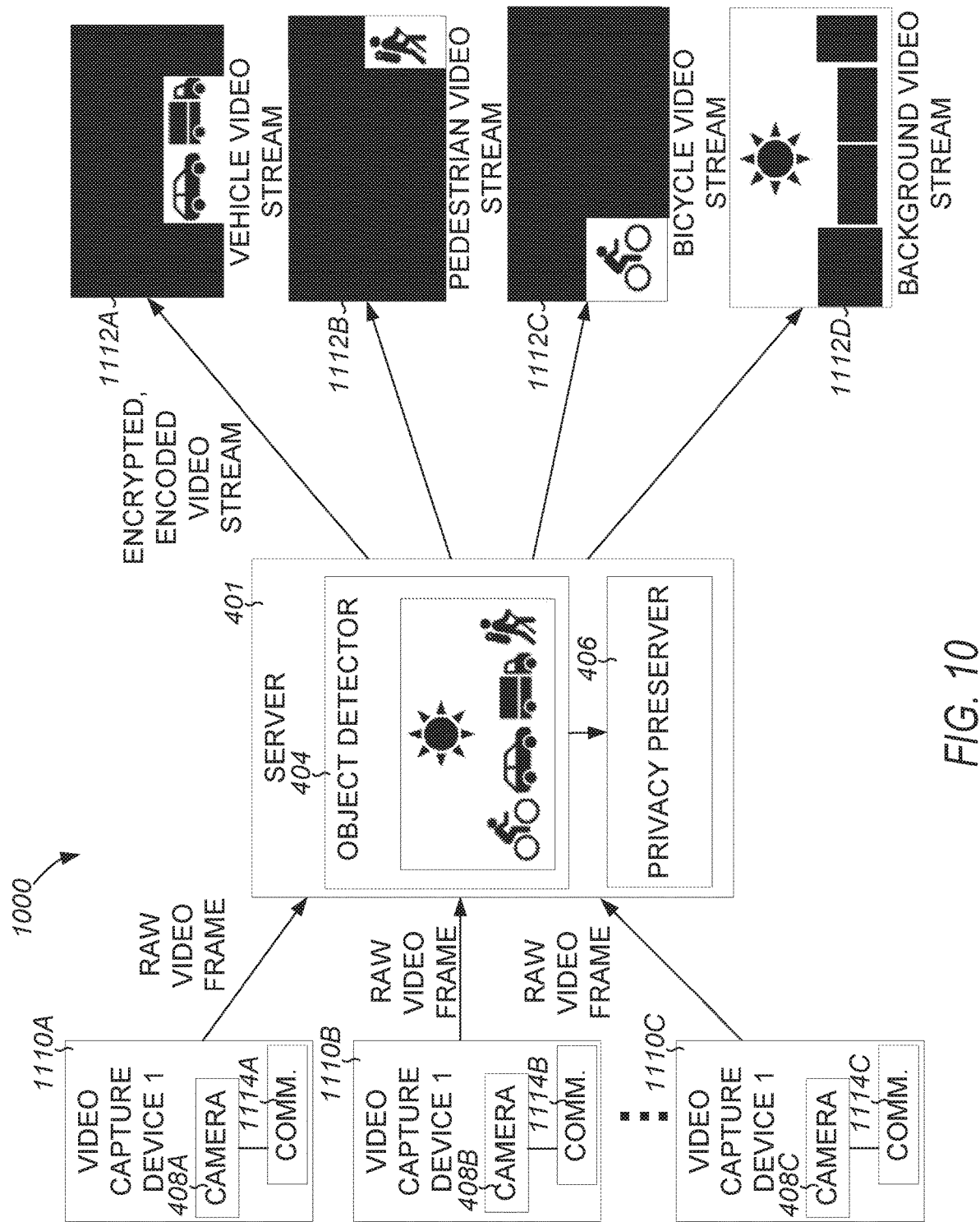
FIG. 10 illustrates, by way of example, a conceptual block diagram of an embodiment of a system for privacy-preserving video streaming.

FIG. 10 illustrates, by way of example, a conceptual block diagram of an embodiment of a system 1000 for privacy-preserving video streaming. The system 1000 can be used to provide video streams with privacy preservation, such as in a multi-use smart city application. Each pixel of each of the raw video frames from one of the video capture devices 1110A, 110B, 1110C is assigned to one or more of the N+1 created object streams. The assignment can be based on whether the object detector 404 determines the pixel corresponds to a detected class. If the detector 404 determines the pixel corresponds to an object of a class, that pixel can be associated with that class. As discussed regarding FIG. 8, an object can be a member of multiple classes, thus a pixel can be assigned to more than one class. All the pixels of a video stream that do not correspond to a pixel associated with the class can be blacked out (e.g., set to a value of 0 or the like). Any pixels of a video frame that are not assigned to a video stream 1112A, 1112B, 112C that corresponds to an object, can be assigned to a video stream 1112D corresponding to the background.

The video capture device 1110A-1110C can include a smartphone, a dedicated camera, or the like. The video capture device 11110A-1110C can include the camera 408A, 408B, 408C, respectively, and communications circuitry 1114A, 1114B, and 1114C, respectively. The communications circuitry 1114A-1114C can include a transmit radio, receive radio, transceiver radio, ethernet port or another communications port, an antenna, a network interface card (NIC), a modulator, demodulator, amplifier, or the like. The privacy preserver 406 can encode and encrypt the video stream data corresponding to the video streams 1112A-1112D.

Embodiments that encode, and then encrypt, still satisfy the key desirable properties provided by an ideal scheme in which encryption occurs before encoding. For example, each object stream can be encrypted with a different key. Therefore, while every user can consume all the object streams through a CDN, they are only able to decrypt the streams which they are authorized to view (whitelisting). Further, each pixel in a frame is assigned to only a limited number of object streams. Therefore, each pixel can be encoded, encrypted, and transmitted to the CDN once for each of the object streams to which they are assigned. Embodiments can thus provide privacy-preserving video streaming in a compute and bandwidth-efficient manner. While embodiments are bandwidth efficient at the edge, they can also save downstream bandwidth at the video consumer. This is at least in part, because most consumers can now only consume relevant object streams instead of an entire video stream.

Embodiments can generate new encryption keys at periodic intervals, such as to help ensure improved security, while allowing consumer viewing permissions to change over time. An additional benefit of benefits can include, despite having a subset of all the encryption keys $k_c$, every consumer can still stream and locally store the encrypted video stream in its entirety. This opens up the possibility of a consumer obtaining permission to process a previously inaccessible object stream from the administrator in the future. A good example of this can be surveillance video. Security personnel can typically be allowed to view all aspects of a video frame (e.g., except human faces). However, if a crime is committed, they can request access to the encryption key $k_{faces}$ required to view faces in a particular time duration. This process is comparable to a legal search warrant, where a judge needs to grant permission to perform an investigative search.

Figure 11:
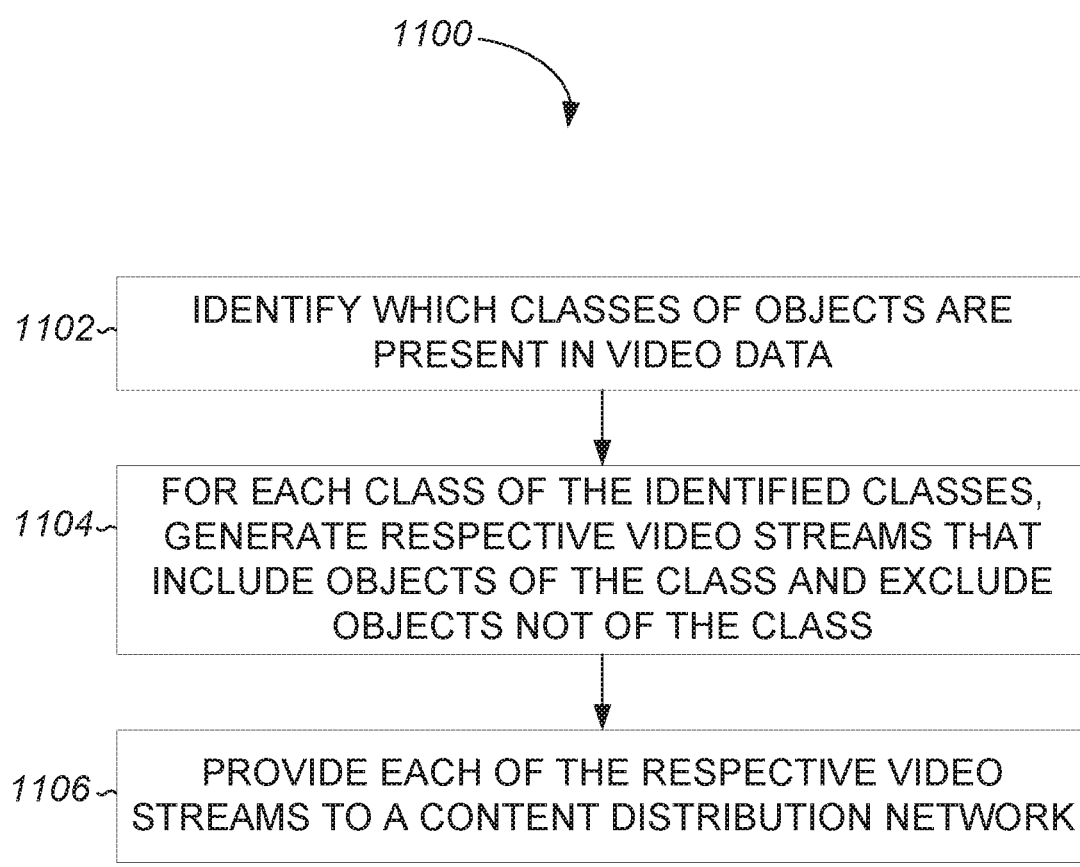
FIG. 11 illustrates, by way of example, a diagram of an embodiment of another method for streaming video data in a privacy-preserving manner.

FIG. 11 illustrates, by way of example, a diagram of an embodiment of a method 1100 for streaming video data in a privacy-preserving manner. The method 1100 as illustrated includes identifying which classes of objects are present in video data, at operation 1102; for each class of the classes identified in the video data, generating respective video streams that include objects of the class and exclude objects not of the class, at operation 1104; and providing each of the respective video streams to a content distribution network, at operation 1106.

The method 1100 can include encrypting each of the respective video streams using different, respective encryption keys before providing each of the respective video streams to the content distribution network. The method 1100 can include, wherein the respective video streams further include pixel data determined to correspond to background redacted therefrom. The method 1100 can further include compressing each of the respective video streams before providing each of the respective video stream to the content distribution network. The method 1100 can further include receiving a request for the video stream of the class. The method 1100 can further include generating the video stream that includes only objects of the class.

Figure 12:
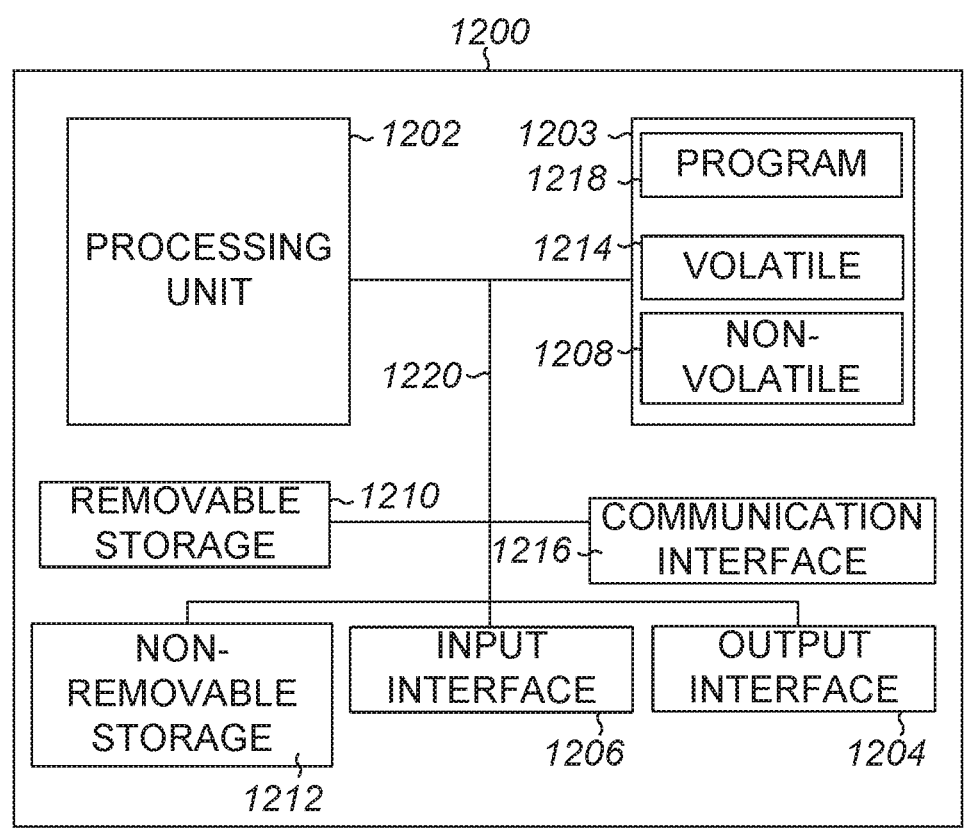
FIG. 12 illustrates, by way of example, a block diagram of an embodiment of a machine (e.g., a computer system) to implement one or more embodiments.

FIG. 12 illustrates, by way of example, a block diagram of an embodiment of a machine 1200 (e.g., a computer system) to implement one or more embodiments. The machine 1200 includes components that can be a part of a server 401, the policy engine 402, an edge device (e.g., the video capture device 1110A-1110C), or another device. The machine 1200 can be used to implement a method of one of FIGS. 9, 11, or other method discussed. One example machine 1200 (in the form of a computer), may include a processing unit 1202, memory 1203, removable storage 1210, and non-removable storage 1212. Although the example computing device is illustrated and described as machine 1200, the computing device may be in different forms in different embodiments. For example, the computing device may instead be a smartphone, a tablet, smartwatch, or other computing device including the same or similar elements as illustrated and described regarding FIG. 12. Devices such as smartphones, tablets, and smartwatches are generally collectively referred to as mobile devices. Further, although the various data storage elements are illustrated as part of the machine 1200, the storage may also or alternatively include cloud-based storage accessible via a network, such as the Internet.

Memory 1203 may include volatile memory 1214 and non-volatile memory 1208. The machine 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the machine 1200, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1202 of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

ADDITIONAL NOTES AND EXAMPLES

Example 1 includes a device comprising object detector circuitry to identify which classes of objects are present in video data, processing circuitry to, for each class of the classes identified in the video data, generate respective video streams that include objects of the class and exclude objects not of the class, and wherein the processing circuitry provides each of the respective video streams to a content distribution network.

In Example 2, Example 1 can further include, wherein the object detector circuitry is further configured to, for each of the classes, identify pixels of each frame of the video data that correspond to an object of that class.

In Example 3, Example 2 can further include, wherein the respective video streams include pixel data from the video data within bounding boxes, ellipses, or silhouettes of objects of that class and the pixel data corresponding to pixels outside the bounding boxes, ellipses, or silhouettes redacted.

In Example 4, at least one of Examples 1-3 can further include, wherein the object detector circuitry is further configured to provide, with each frame of the video data, metadata indicating, for each object identified, the class identified and a respective confidence value for that class.

In Example 5, at least one of Examples 1-4 can further include encryption circuitry to encrypt each of the respective video streams using different, respective encryption keys before providing each of the respective video streams to the content distribution network.

In Example 6, at least one of Examples 1-5 can further include, wherein the respective video streams further include pixel data determined to correspond to background redacted therefrom.

In Example 7, at least one of Examples 1-6 can further include compression circuitry to compress each of the respective video streams before providing each of the respective video stream to the content distribution network.

In Example 8, at least one of Examples 1-7 can further include communications circuitry to receive a request for the video stream of that class and generate a request to the object detector circuitry to identify objects of that class in the video data, wherein the object detector circuitry is further configured to, in response to receiving the request, generate the video stream of that class.

In Example 9, Example 8 can further include, wherein the request for the video stream is from a policy engine that is separate from the content distribution network.

In Example 10, Example 9 can further include, wherein the policy engine verifies a user is authorized to view the video stream of that class before transmitting the request.

In Example 11, at least one of Examples 1-10 can further include, wherein the object detector circuitry is configured to implement a convolutional neural network model to identify which classes of objects are present in the video data.

Example 12 includes a non-transitory machine-readable medium including instructions that, when executed by a server, cause the server to perform operations comprising identifying which classes of objects are present in video data, for each class of the classes identified in the video data, generating respective video streams that include objects of the class and exclude objects not of the class, and providing each of the respective video streams to a content distribution network.

In Example 13, Example 12 can further include, wherein the operations further include, for each of the classes, identify pixels of each frame of the video data that correspond to an object of that class.

In Example 14, Example 13 can further include, wherein the respective video streams include pixel data from the video data within bounding boxes, ellipses, or silhouettes of objects of that class and the pixel data corresponding to pixels outside the bounding boxes, ellipses, or silhouettes redacted.

In Example 15, at least one of Examples 12-14 can further include, wherein the operations further include providing, with each frame of the video data, metadata indicating, for each object identified, the class identified and a respective confidence value for that class.

Example 16 includes a privacy-preserving method for providing a stream of video data, the method comprising operations of one of Examples 12-15.

Example 17 includes a privacy-preserving method for providing a stream of video data, the method comprising identifying which classes of objects are present in video data, for each class of the classes identified in the video data, generating respective video streams that include objects of the class and exclude objects not of the class, and providing each of the respective video streams to a content distribution network.

In Example 18, Example 17 can further include encrypting each of the respective video streams using different, respective encryption keys before providing each of the respective video streams to the content distribution network.

In Example 19, at least one of Examples 17-18 can further include, wherein the respective video streams further include pixel data determined to correspond to background redacted therefrom.

In Example 20, at least one of Examples 17-19 can further include compressing each of the respective video streams before providing each of the respective video stream to the content distribution network.

In Example 21, at least one of Examples 17-20 can further include receiving a request for the video stream of the class and generating the video stream that includes only objects of the class.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
   object detector circuitry to identify which classes of objects are present in video data;

processing circuitry to, for each class of the classes identified in the video data, generate respective video streams that include objects of the class and exclude objects not of the class; and wherein the processing circuitry provides each of the respective video streams to a content distribution network.

2. The device of claim 1, wherein the object detector circuitry is further configured to, for each of the classes, identify pixels of each frame of the video data that correspond to an object of that class.

3. The device of claim 1, wherein the object detector circuitry is further configured to provide, with each frame of the video data, metadata indicating, for each object identified, the class identified and a respective confidence value for that class.

4. The device of claim 1, further comprising encryption circuitry to encrypt each of the respective video streams using different, respective encryption keys before providing each of the respective video streams to the content distribution network.

5. The device of claim 1, wherein the respective video streams further include pixel data determined to correspond to background redacted therefrom.

6. The device of claim 1, further comprising compression circuitry to compress each of the respective video streams before providing each of the respective video stream to the content distribution network.

7. The device of claim 1, further comprising:
communications circuitry to receive a request for the video stream of that class, and generate a request to the object detector circuitry to identify objects of that class in the video data; and
wherein the object detector circuitry is further configured to, in response to receiving the request, generate the video stream of that class.

8. The device of claim 1, wherein the object detector circuitry is configured to implement a convolutional neural network model to identify which classes of objects are present in the video data.

9. The device of claim 2, wherein the respective video streams include pixel data from the video data within bounding boxes, ellipses, or silhouettes of objects of that class and the pixel data corresponding to pixels outside the bounding boxes, ellipses, or silhouettes redacted.

10. The device of claim 7, wherein the request for the video stream is from a policy engine that is separate from the content distribution network.

11. The device of claim 10, wherein the policy engine verifies a user is authorized to view the video stream of that class before transmitting the request.

12. A non-transitory machine-readable medium including instructions that, when executed by a server, cause the server to perform operations comprising:
identifying which classes of objects are present in video data;
for each class of the classes identified in the video data, generating respective video streams that include objects of the class and exclude objects not of the class; and
providing each of the respective video streams to a content distribution network.

13. The non-transitory machine-readable medium of claim 12, wherein the operations further include, for each of the classes, identify pixels of each frame of the video data that correspond to an object of that class.

14. The non-transitory machine-readable medium of claim 12, wherein the operations further include providing, with each frame of the video data, metadata indicating, for each object identified, the class identified and a respective confidence value for that class.

15. The non-transitory machine-readable medium of claim 13, wherein the respective video streams include pixel data from the video data within bounding boxes, ellipses, or silhouettes of objects of that class and the pixel data corresponding to pixels outside the bounding boxes, ellipses, or silhouettes redacted.

16. A privacy-preserving method for providing a stream of video data, the method comprising:
identifying which classes of objects are present in video data;
for each class of the classes identified in the video data, generating respective video streams that include objects of the class and exclude objects not of the class; and
providing each of the respective video streams to a content distribution network.

17. The method of claim 16, further comprising encrypting each of the respective video streams using different, respective encryption keys before providing each of the respective video streams to the content distribution network.

18. The method of claim 16, wherein the respective video streams further include pixel data determined to correspond to background redacted therefrom.

19. The method of claim 16, further comprising compressing each of the respective video streams before providing each of the respective video stream to the content distribution network.

20. The method of claim 16, further comprising:
receiving a request for the video stream of the class; and
generating the video stream that includes only objects of the class.

* * * * *